May 26, 1959    W. W. MEYER ET AL    2,888,280
SEAL
Filed June 30, 1954
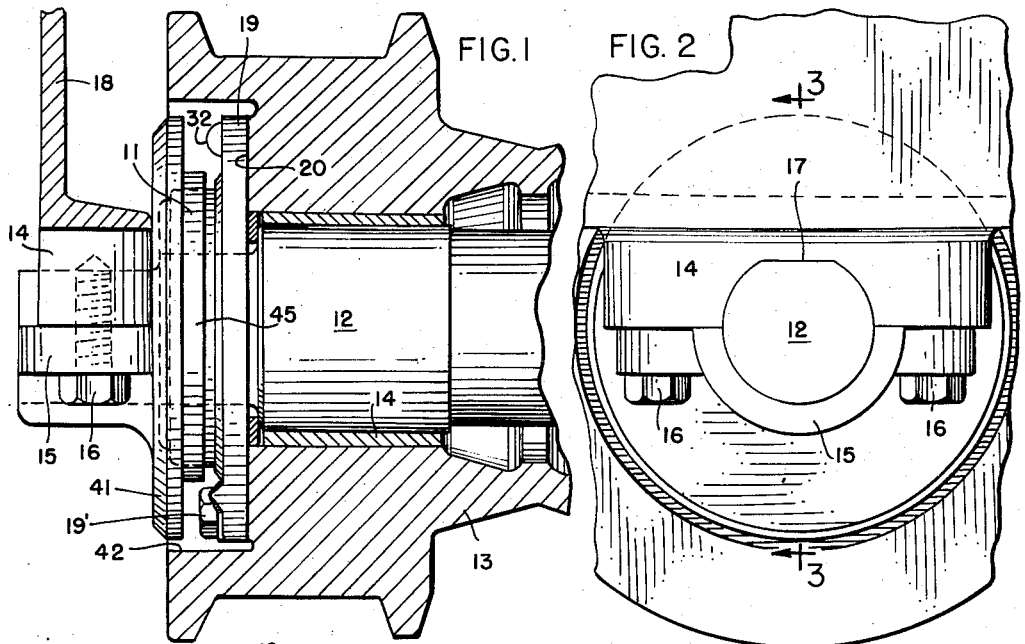
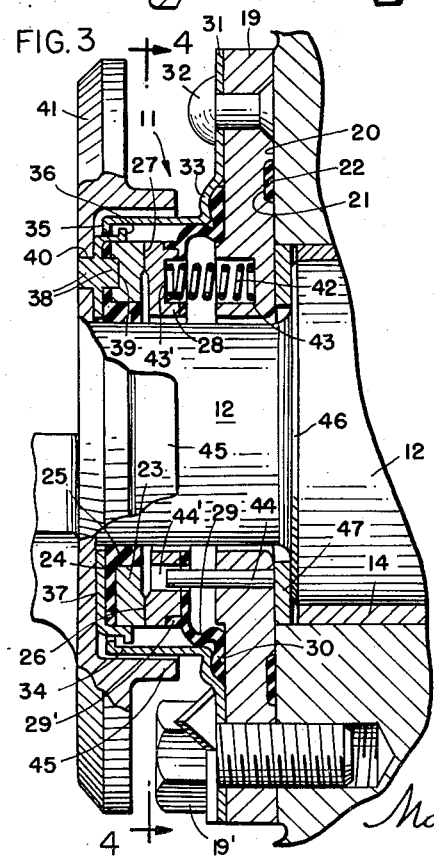
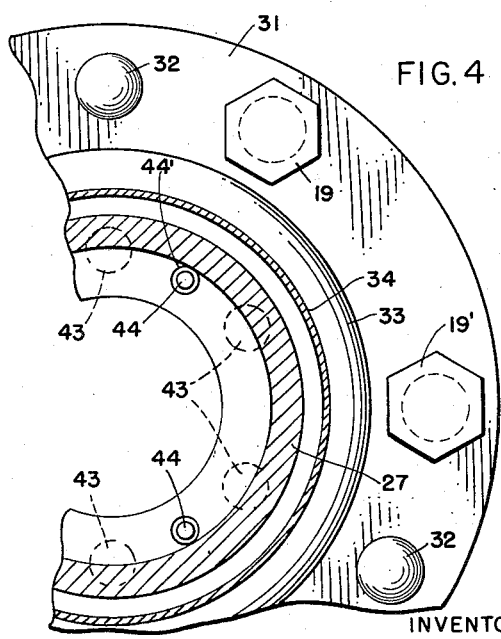
INVENTORS:-
WALTER W. MEYER
RICHARD J. HICKS
LEONARD N. DOLHUN
BY:—
Marzall, Johnston, Cook & Root
ATTORNEYS

United States Patent Office 2,888,280
Patented May 26, 1959

2,888,280

SEAL

Walter W. Meyer, Arlington Heights, Richard J. Hicks, Elmwood Park, and Leonard N. Dolhun, Chicago, Ill., assignors, by mesne assignments, to Muskegon Piston Ring Company, Muskegon, Mich., a corporation of Michigan Application June 30, 1954, Serial No. 440,404

4 Claims. (Cl. 286—11)

The present invention relates in general to seals and sealing, and has more particular reference to the sealing of shafts and arbors to prevent the flow of liquid or other fluid material along the shaft, as through a wall opening in which the shaft extends, the invention pertaining more especially to dirt excluding, lubricant retaining seal means for use in conjunction with structures embodying shaft bearings.

An important object of the present invention is to provide an improved seal of simplified construction and unusually efficient operating characteristics, the seal being particularly adapted for use in conjunction with shaft bearing structures for the exclusion of dirt and other foreign matter, and the retention of bearing lubricant.

Another important object is to provide a dirt excluding, lubricant retaining seal structure for application on axle mounted wheels or rollers; a further object being to provide a seal structure particularly well suited for sealing the axle mounted track guiding and supporting rollers employed in vehicles of the crawler or track laying type.

Another important object is to provide a seal structure comprising a self-contained unit adapted for assembly in operating position by merely applying the unit in sealing position on the shaft and fastening the unit in place upon the cooperating member, through which the shaft extends.

Another important object is to provide a seal of relatively inexpensive construction, the parts being formed to facilitate assembly as a seal unit.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a sectional view of a shaft structure fitted with sealing means embodying the present invention;

Fig. 2 is an end view of the structure shown in Fig. 1;

Fig. 3 is an enlarged sectional view taken substantially along the line 3—3 in Fig. 2; and Fig. 4 is a view taken substantially along the line 4—4 in Fig. 3.

To illustrate the invention, the drawings show a seal structure 11 adapted for assembly around a shaft 12 for sealing against movement of liquid or other flowable material along the shaft, past an opening in a cooperating member through which the shaft extends. It should be understood, of course, that the device of the present invention may be employed for sealing either a rotary shaft at the opening in a stationary member, such as a wall, through which the shaft extends and in which it is turnably mounted, or for sealing a stationary shaft, such as an axle, at the opening formed in a cooperating member such as an axle mounted wheel or rotor through which the shaft extends. As shown herein, the seal 11 is shown as applied to a stationary axle or shaft 12, which extends through an opening formed in a roller or wheel 13, the wheel being turnably mounted upon the axle, as by means of a journal or bearing 14 mounted in the wheel.

The illustrated wheel 13 and the axle 12 are of the sort currently employed in track laying vehicles of the crawler type, for supporting and guiding the endless track element between the track carrying wheels of the vehicle, the axle 12 in such track carrying structures being secured at each of the opposite ends thereof in suitable shaft mounting brackets forming a part of the frame of the vehicle. Since the shaft mounting structure is identical at each of the opposite ends of the shaft 12, only one end of the shaft is illustrated, and only one end of the roller 13 is shown.

Each end of the shaft may be clampingly secured in a mounting bracket 14, as by means of a semi-cylindrical shaft engaging clamp 15 adapted to be secured on the bracket 14, as by means of bolts 16, the bracket and shaft being formed with cooperating means, such as the interengaging flat portions shown at 17, for holding the shaft against rotation in the bracket. The bracket 14, in turn, may be secured upon the vehicle frame in any suitable or preferred fashion, as by welding the same to a channel member 18 forming a part of the vehicle frame.

In order to exclude dirt, gravel, and other foreign matter from the shaft opening of the wheel 13 and hence from the bearing disposed in said opening, the seal structure 11 may comprise a preferably circular mounting plate 19 having a central shaft receiving opening sized to receive the shaft for free turning movement therein, said plate having a rear face adapted to seat upon and engage with a preferably finished plate seating surface 20 formed on the member 13 around the shaft opening. If desired, the plate 19 may be formed with an annular groove 21 for the reception of preferably resilient rubber-like packing material 22 in position to sealingly engage the surface 20. Any suitable means, such as the studs 19', may be employed for securing the plate 19 upon the seat 20.

The seal structure may also comprise a ring element 23 formed with a layer of resilient rubber-like gasket material, bonded to the ring 23 and including a portion 24 in position covering one side of the ring, and another portion 25 in position covering the inwardly facing cylindrical surface of the ring, said portion 25 being sized to snugly, resiliently, sealingly and frictionally engage upon and around the surfaces of the shaft 12. The ring 23, on its side opposite from the gasket portion 24, may be formed with a finished annular seal surface 26 in position to engage and make a running seal or ground joint with a cooperating finished surface 27 formed on a ring element 28 sized to turnably receive the shaft 12. As shown, the element 28 may be formed with a shaft opening large enough to loosely encircle the shaft. It is preferable, however, that the ring be sized to form a snug yet running fit with the shaft to thereby center the ring element 28 on the shaft in coaxial alinement with the ring 23. Such snug yet running fit serves to prevent relative gyration of the rings 23 and 28, thereby eliminating all danger of wiping dirt into the ground joint formed by the surfaces 26 and 27.

The ring 28 may be sealed to the plate 19 by means of a flexible diaphragm 29 of rubber-like material, said diaphragm having inner edge portions bonded, and hence sealingly secured, upon the face of the ring 28 opposite from the face carrying the running seal surface 27, said diaphragm having an annular flange portion 29' seating in a peripheral groove formed in the ring 28, said flange portion being bonded to the ring in said groove. The diaphragm also is preferably formed with an enlarged bead 30 defining the peripheral edge of said diaphragm, said peripheral edge of the diaphragm being clampingly and sealingly secured on the plate 19 by means of a formed sheet metal clamping plate 31, having marginal portions adapted to overlie the marginal portions of the plate 19, whereby the clamping plate 31 may be firmly secured to the plate 19, as by means of rivets 32 or other preferred fastening expedient. Inwardly of the rivets 32, the clamping plate 31 may be formed with a circular flute 33 adapted to clampingly receive the bead 30 and thereby sealingly hold the peripheral edge of the diaphragm 29 on the plate 19 outwardly of the shaft receiving opening of said plate. Inwardly of the flute 33, the clamping plate 31 may provide an integral cylindrical portion 34 enclosing the rings 23 and 28 and the flexible portions of the diaphragm 29 which extend inwardly of the peripheral bead 30, said cylindrical portion being formed at its end remote from the flute 33 with an inwardly turned annular flange 35, in position to interengage with a cooperating outwardly extending annular flange 36 formed on the peripheral edge of a cover plate 37.

Said cover plate may be and preferably is formed with pegs 38 in circularly spaced relationship on the plate 37, said pegs extending on the opposite sides of the plate to fit in corresponding sockets 39 formed in the ring 23 to drivingly connect the plate 37 with the ring. The pegs 38 on the ring remote side of the plate 37 are formed to drivingly engage in cavities 40 formed in a preferably circular guard plate 41, which is preferably formed as an integral extension of the clamp member 15, said guard plate being sized to fit within and substantially close a cylindrical cavity formed in the wheel or roller 13 for receiving the seal structure 11 within said cavity.

Means is provided for yieldingly urging the ring 28 in a direction away from the plate 19, to thereby force said ring 28 into frictional running engagement with the ring 23, thereby thrusting the ring 23 upon the cover plate 37, whereby to press the cover plate against the guard plate 41. Such thrust means, as shown, may comprise a plurality of circularly spaced helical springs 42, mounted at their opposite ends in sockets 43 and 43' respectively formed in the plate 19 and the ring 28, inwardly of the diaphragm 29.

Means is also provided for splining the ring 28 with the plate 19 to prevent relative rotation of the ring with respect to the plate, such splining means preferably comprising a pin 44 mounted in the plate 19 and having an end extending in an opening 44' formed in the ring 28. If desired, the guard plate 41 may be provided with an inwardly extending cylindrical flange 45 encircling the cylindrical portions 34 of the clamping member 31.

As shown, the shaft portions which extend through the seal structure 11 are of lesser diametral dimension than the shaft portion which extends in the journal 14, thereby providing an annular shoulder 46 on the shaft, in position facing toward the inner portions of the plate 19, which may thus constitute a thrust bearing opposite the shaft shoulder 46, an annular bearing member 47 being preferably interposed between the shoulder 46 and the inner portions of the plate 19.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. In combination with a shaft member and a member encircling said shaft wherein one of said members is journalled on the other member and one of said members is stationary and the other said member is rotatable, a seal carried by said members including an annular plate received over the shaft member, means for sealingly securing said annular plate to said encircling member, sealing means arranged between said annular plate and said encircling member, a guard plate arranged over the end of the shaft member and secured thereto, said guard plate being axially spaced from said annular plate, a first ring on said shaft member between said plates and spaced closely to said guard plate, a resilient gasket bonded to said first ring and sealingly encircling said shaft member, means connecting said guard plate and said first ring together thereby preventing relative rotation therebetween, said first ring having a finished radial surface facing said annular plate, a second ring on said shaft between said annular plate and said first ring, said second ring having a finished radial surface facing said first ring and in mating engagement therewith to define a running seal, resilient means between said annular plate and said second ring continually biasing said second ring against said first ring, means for splining said second ring to said annular plate to prevent relative rotation therebetween, and a flexible annular diaphragm extending between said annular plate and second ring, said diaphragm having its opposite ends sealingly connected to said annular plate and said second ring, whereby a complete seal is effected between said members.

2. The combination of claim 1, wherein said splining means includes a plurality of pins projecting from said annular plate and into sockets formed in said second ring.

3. The combination of claim 1, wherein one end of said diaphragm is bonded to said second ring, and including clamping means for clamping the other end to said annular plate.

4. The combination of claim 1, wherein said means for connecting said guard plate and said first ring together includes a plurality of circumferentially arranged pegs, one end of each peg received in a socket formed in said first ring and the other end of each peg received in a socket formed in said guard plate.

References Cited in the file of this patent

UNITED STATES PATENTS

| | | |
|---|---|---|
| 1,878,804 | Baker et al. | Sept. 20, 1932 |
| 2,296,724 | McCormack | Sept. 22, 1942 |
| 2,347,118 | Matter | Apr. 18, 1944 |
| 2,385,420 | Meyer | Sept. 25, 1945 |
| 2,414,600 | Land et al. | Jan. 21, 1947 |
| 2,444,713 | Solari | July 6, 1948 |
| 2,447,930 | Biggs | Aug. 24, 1948 |
| 2,489,781 | Isenbarger | Nov. 29, 1949 |
| 2,615,739 | Vedovell | Oct. 28, 1952 |
| 2,639,170 | Schick et al. | May 19, 1953 |
| 2,672,360 | Chambers, et al. | Mar. 16, 1954 |
| 2,701,154 | Dolhun | Feb. 1, 1955 |
| 2,722,439 | Brummer et al. | Nov. 1, 1955 |